United States Patent [19]

Filbrun

[11] 4,366,867
[45] Jan. 4, 1983

[54] HORIZONALLY FOLDING AGRICULTURAL IMPLEMENT AND HINGE

[76] Inventor: Ronald A. Filbrun, R.R. #4, Box 260, Pendleton, Ind. 46064

[21] Appl. No.: 131,536

[22] Filed: Mar. 18, 1980

[51] Int. Cl.³ .............................................. A01B 73/00
[52] U.S. Cl. .................................... 172/776; 172/311; 280/411 A
[58] Field of Search ............... 172/311, 456, 662, 776; 56/228, 385; 280/411 R, 411 A, 411 B, 411 C, 412, 413, 639, 656; 74/99 R

[56] References Cited

U.S. PATENT DOCUMENTS

| | | | |
|---|---|---|---|
| 3,208,536 | 9/1965 | Orendorff | 172/456 |
| 4,034,623 | 7/1977 | Boone et al. | 56/228 X |
| 4,078,441 | 3/1978 | Mazur | 74/99 R |
| 4,181,032 | 1/1980 | Wagner et al. | 74/99 R |

Primary Examiner—Richard T. Stouffer
Attorney, Agent, or Firm—McWilliams, Mann & Zummer

[57] ABSTRACT

A horizonally folding agricultural implement, such as a corn planter, comprising a main frame section with a hitch extending perpendicular therefrom for attachment to a vertically movable drawbar of a farm tractor, and a forwardly folding end wing section hinged to each outer end of the main frame section by a generally vertical pivot hinge, with the pivot hinge including a first and second set of pivot bushings rigidly attached to the abutting ends of the main frame section and the end wing sections respectively in vertical axial alignment with each other, the top end of the pivot pin having a mounting plate secured thereto, with a first hydraulic actuating assembly having one end operatively connected to the rigid plate and the other end operatively connected to the main frame section, and a second hydraulic actuating assembly having one end operatively connected to the rigid mounting plate and the other end thereof operatively connected to the folding wing section, thereby, upon actuation of the hydraulic actuating assembly in the wing sections are aligned with the main frame section in the operating, or planting position, the pivot pin is rotated approximately 90 degrees, thereby swinging the folding wing sections forward approximately 90 degrees, and, simultaneously therewith, the actuation of the second hydraulic actuating assembly rotates the folding end wing section forward an additional 90 degrees about the pivot pin to a position generally parallel to and adjacent the main frame section to reduce the overall width of the agricultural implement for transport purposes.

3 Claims, 6 Drawing Figures

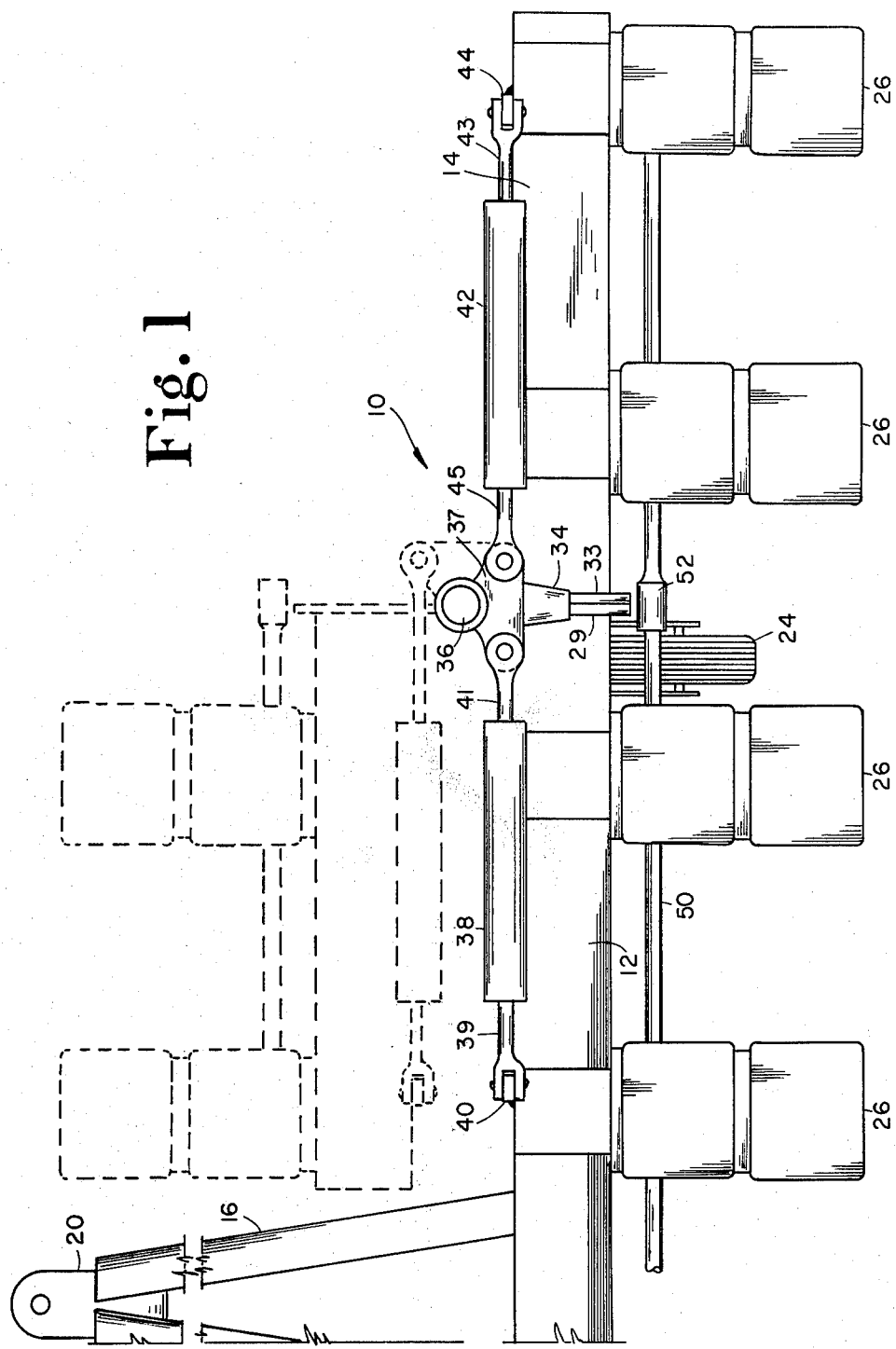

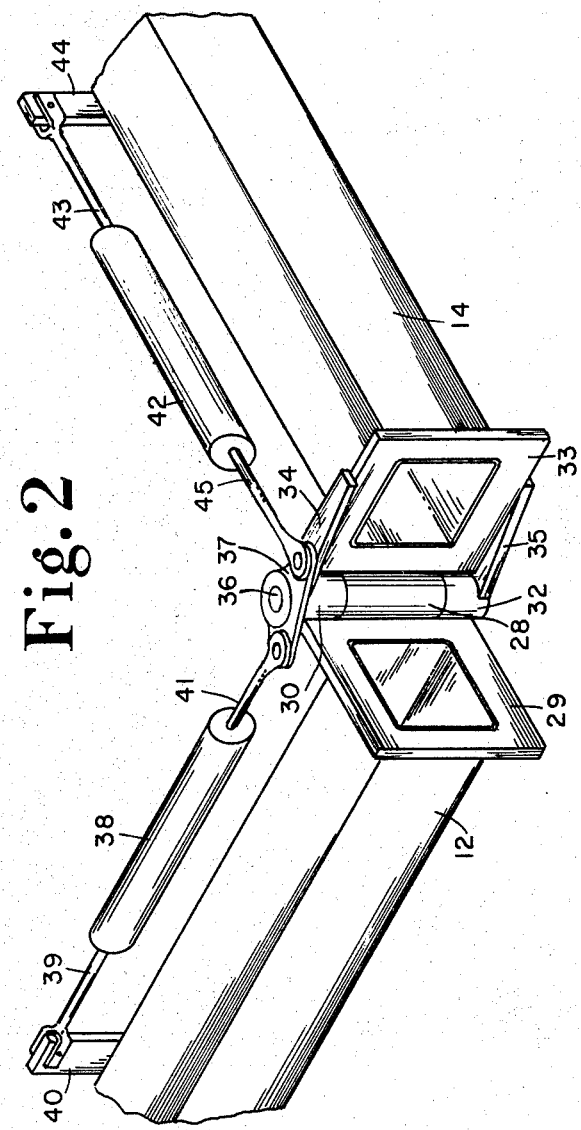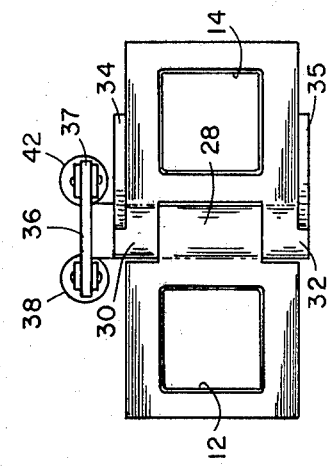

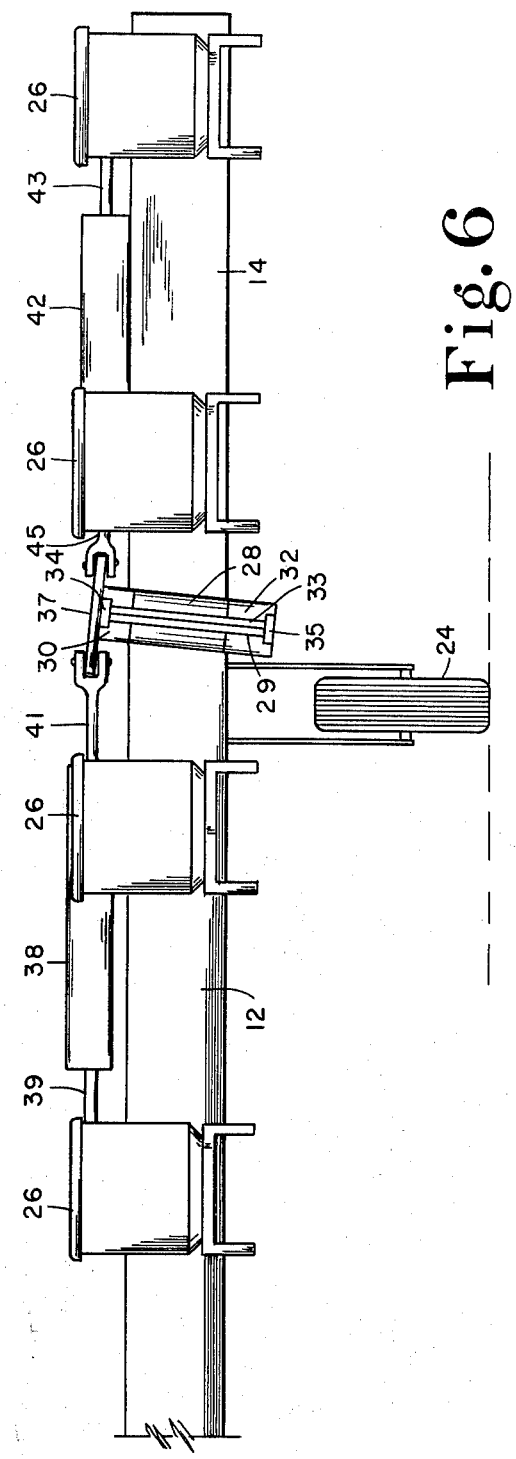

HORIZONALLY FOLDING AGRICULTURAL IMPLEMENT AND HINGE

BACKGROUND OF THE INVENTION

1. Field of the Invention

This invention relates to an agricultural implement, such as a corn planter, or similar agricultural device, adapted to be pulled behind a tractor having a vertically movable tool draw bar, and, more specifically, to a folding agricultural implement having outer wing sections attached to each end of a central frame section and having a hydraulically actuated folding means built into the pivot pin assembly at the pivot points between the main frame section and the folding wing sections to cause the outer wing sections to fold in a forward direction when the hydraulic means is actuated to reduce the overall width of the agricultural implement for transporting the equipment along a roadway, and to swing the wings rearwardly into alignment with the main frame section for operational use.

2. Description of the Prior Art

As the cost of farming and farm equipment continues to increase, farm equipment manufacturers are constantly designing and developing new farm equipment in an effort to increase the efficiency of farm equipment. One such method of increasing the efficiency of farm work is to increase the size capacity of the equipment to enable one farmer to cover more ground than was done previously with the older equipment. In order to enable a farmer to do this, the size of the equipment, such as the planting equipment or implements, the cultivating implements, and the harvesting implements, must be increased. However, one major drawback to the increased size of farm implements is the problem of transporting the farm implements from field to field along the public roads and highways, due to their greatly increased sizes.

Numerous designs have been suggested in an effort to enable the larger equipment to be transported along the public roads and highways. One such method of decreasing the size of farm implements for transportation purposes is to fold the implement into sections for transporting purposes. One such early effort at obtaining folding farm implements is shown by U.S. Pat. No. 2,322,086 to Zimmerman, issued in 1943, which generally shows a drawbar having a main section and end sections which could be folded forward to decrease the overall width of the drawbar.

Later such efforts are shown by U.S. Pat. Nos. 2,958,383, to Danielson, which discloses a cultivator attachment, and 2,970,658 to Kopaska, which discloses a harrow transport. However, none of these prior art references attempt to achieve the same results as does the present invention.

U.S. Pat. No. 3,208,536 to Orendorff incorporates a design somewhat similar to that of the present invention in that Orendorff does disclose a folding agricultural implement, such as a corn planter, utilizing a main frame section with forwardly folding wing sections pivotably attached to each end of the main frame section in a manner somewhat similar to that of the present invention. However, the Orendorff device is manually operated and raises and lowers the main implement frame relative to the tractor drawbar to achieve certain pin angles, in a manner different from that of the present invention. In each of the prior art devices the folding wing mechanisms were cumbersome and somehwat ackward to use and actuate.

SUMMARY OF THE INVENTION

The present invention seeks to eliminate many of the problems presented by the prior art folding agricultural implement inventions by presenting a device employing a unique pivot pin angle in combination with a self-supporting hydraulically actuated hinge means to enable the folding wing sections of the agricultural implement to be folded hydraulically forward by the operator from the cab of the farm tractor from an operating position to a forwardly folded transportation position.

Another advantage of the present invention over the prior art devices is to utilize a unique pin angle to enable the outer ends of the folding wing sections to be elevated slightly as the wing sections are folded forward to obtain a more desirable transport width.

A further advantage of the present invention is the use of a unique hinge design to greatly reduce the hinge wear and the need for repair or replacement thereof.

A still further advantage of the present invention is the use of a unique pin construction utilizing hydraulic actuating means to accomplish the folding and unfolding of the outer wing sections directly from the tractor without requiring the operator to manually fold and unfold the outer folding wing sections of the farm implement.

These and other advantages and objects will be more readily seen when reading the specification in light of the drawings accompanying this application and forming a part thereof.

BRIEF DESCRIPTION OF THE DRAWINGS

FIG. 1 is a plan view of one end of the present invention showing the folding wing section in the unfolded and folded positions;

FIG. 2 is a partial view of the hinge construction ccording to the present invention in the partially folded position;

FIG. 3 is a longitudinal end view of FIG. 2 showing the folding wing section in the folded position;

DESCRIPTION OF THE PREFERRED EMBODIMENTS

The preferred embodiments of the present invention will now be described with reference to the accompanying Figures.

Referring to FIG. 1 of the drawings, the forwardly folding farm implement, in the embodiment of a corn planter is shown at 10. The corn planter 10 consists of a main frame section 12 having an outer forwardly folding wing section 14 hinged to each end thereof. FIG. 1 is a partial view showing the right hand side of the planter only. The left side of the planter is the mirror image of FIG. 1.

Figure 4:
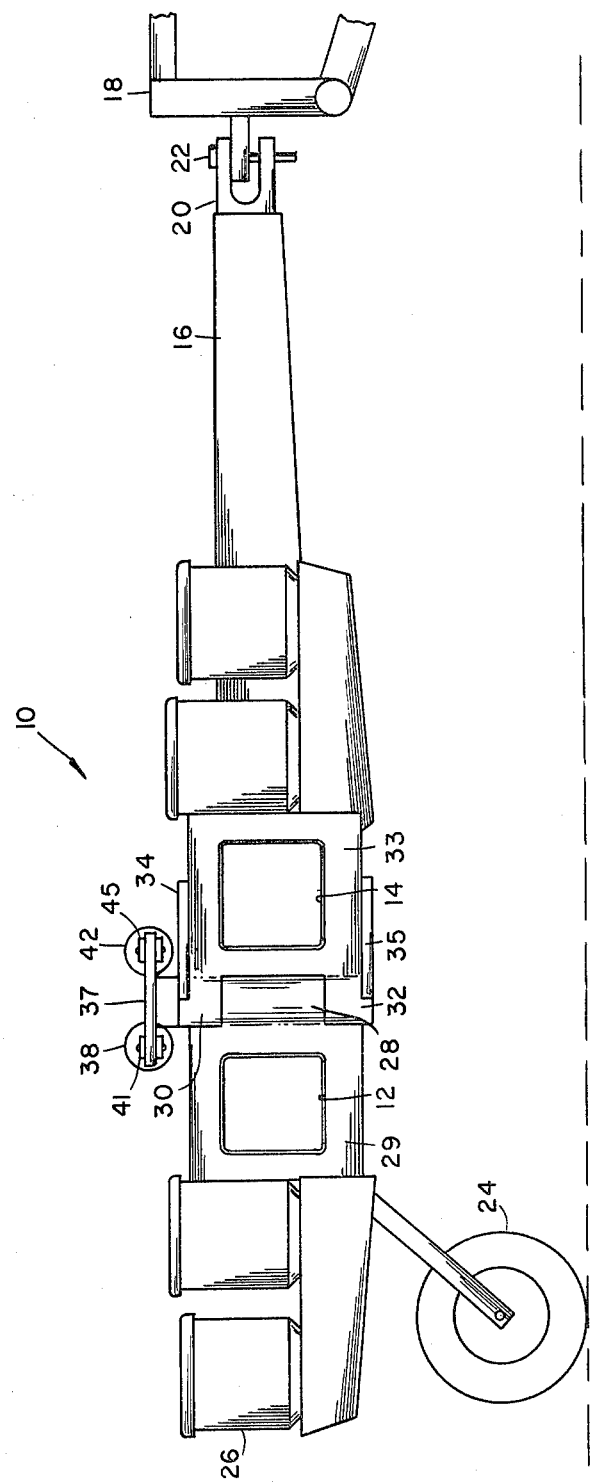
FIG. 4 is a right end view of the present invention with the folding wing section in the folded position and the tractor drawbar raised in the transport position.
Figure 5:
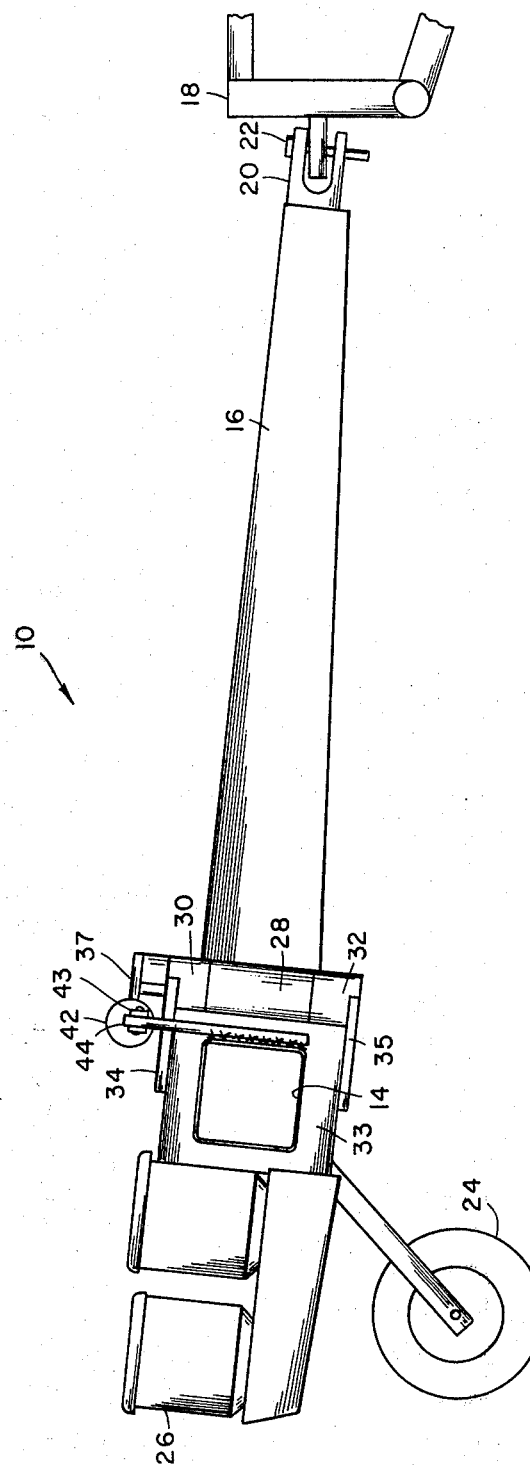
FIG. 5 is a right end view of the planter utilizing the present invention with the folding wing section in the unfolded position and the tractor drawbar lowered to the operating or planting position; and, FIG. 6 is a rear view of the hinged construction according to the present invention showing a partial cross-section view of one modification of the present invention.

Referring to FIG. 1 and, more specifically, to FIGS. 4 and 5 of the drawings, the main frame section 12 of the planter 10 has a hitch tongue 16 extending forwardly therefrom for attachment to a certically moveable drawbar 18 operatively mounted on a traction vehicle, such as a farm tractor (not shown) by means of a hitch clevis 20 attached to the end of the hitch tongue 16 and a hitch pin 22, or similar, commonly used implement connecting devices.

The planter 10 is supported by means of vertically moveable support wheel assemblies 24 attached to the mainframe section 12 of the planter 10 and adapted to be moved vertically to raise and lower the planter 10 from the operating or planting position to the transport position, as well be more fully described hereinafter. Planter units 26 are mounted on the main frame section 12 and the outer folding wing sections 14 in a spaced-apart relationship, as shown in FIGS. 1 and 6 in standard, well-known manner to those skilled in the farm implement art. The planter units 26 are conventional, commercially available units, and the construction and operation thereof are well known to those skilled in the art. Therefore, the specific structural and operational details of the planter units 26 and not shown in the drawings and will not be described in detail.

The embodiment according to the present invention illustrated in FIGS. 1, 4 and 5 are used on 8-row planters, on which 4 planter units 26 are mounted on the main frame section 12 and 2 planter units 26 are mounted on each of the left and right forwardly folding wing sections. The embodiment of the present invention shown in FIG. 6 of the drawings is employed on a 12-row planter unit, which has six planter units 26 mounted on the main frame section 12 and three planter nuits 26 mounted on each of the outer folding wing sections 14. This embodiment will be more fully described hereinafter.

Referring now specifically to FIGS. 1, 2 and 3, the details of the hinge assembly of the horizontally folding agricultural implement according to the present invention will now be described. Referring specifically to FIGS. 2 and 3, the hinge assembly consists of a large center bushing 28 which is welded to a plate 29. The plate 29 has a central opening thereon corresponding to the outer dimension of the tube 12 of the main frame section. The plate 29 having the center bushing 28 welded thereto is welded to the end of the main frame section 12, as shown in FIG. 2. A top bushing 30 and a lower or bottom bushing 32 are each welded to a second plate 33. The second plate 33 has an opening therein which corresponds to the exterior dimensions of the end of the tube of the outer folding wing section 14. The second plate 33 is welded to the end of the outer folding wing section 14, as shown in FIG. 2. The bushings 28, 30 and 32 are attached to the plates 29 and 33 in such a manner as to be placed in axial alignment with each other at all times, and to allow the folding wing section 14 to be opened into axial alignment with the main frame section 12, as shown in detail in FIG. 1, when the planter is placed in the operating position.

The top bushing 30 and lower bushing 32 are both reinforced and supported on the plate 33 by a top gusset or brace 34 and bottom gusset or brace 35, respectively, in order to provide additional strength to the hinge assembly. A hinge or pivot pin 36 is positioned through the bushings 28, 30 and 32 to maintain the bushings in axial alignment with each other and to allow the outer folding wing section 14 to move from a folded transport position shown in phantom in FIG. 1 to an unfolded working position shown by the solid lines in FIG. 1.

Referring to FIGS. 1, 2 and 3 of the drawings, a hydraulic attaching means attaching plate or flange 37 having a generally triangular shape, as may be seen in FIG. 1, is rigidly attached to the hinge pin 36, by welding or other suitable securing means. The attaching plate or flange 37 has two holes placed therein in a spaced-apart relationship relative to the hinge pin 36 in other to attach the ends of hydraulic actuating means, such as the movable rods 41 and 45 of hydraulic cylinder assemblies 38 and 42, as may be seen in detail in FIG. 2.

Hydraulic actuating means comprising first and second hydraulic piston and cylinder assemblies 38 and 42, respectively, are operatively connected between the main frame section 12, the outer folding wing sections 14, and the attaching plate or flange 37 secured to the hinge pin 36, as shown in FIGS. 1 and 2 of the drawings. The first hydraulic actuating means, consisting of the first hydraulic piston and cylinder assembly 38 has one end thereof operatively attached to the main frame section 12 by means of the connecting rod assembly 39 operatively attached to a mounting bracket 40 secured to the main frame section 12. The opposite end of the first hydraulic actuating means or piston and cylinder assembly 38 is operatively connected to the attaching plate 37 of the hinge pin 36 by means of rod assembly 41.

As shown further in FIGS. 1 and 2, a second hydraulic actuating means in the form of a hydraulic piston and cylinder assembly 42 is operatively connected between the outer folding wing section 14 and the attaching plate or flange 37 secured to the hinge pin 36 by means of connecting rod assemblies 43 and 45 operatively connected to a rigid mounting bracket 44 and to the attaching plate or flange 37, respectively. The rigid mounting bracket 44 is rigidly secured to the outer folding wing section 14 by welding or other suitable methods.

The operation of the preferred embodiments of the present invention will now be described with reference to the drawings.

As shown in FIG. 1, when the farm implement 10 according to the present invention is folded for transport purposes, the outer folding wing sections 14 are folded one hundred eighty (180) degrees forward and positioned as shown by the dotted lines. The vertically moveable drawbar 18 attached to the farm traction vehicle or tractor (not shown) is placed in the raised position, as shown in FIG. 4 of the drawings, and the vertically moveable wheel assemblies 24 are moved down to raise the entire implement 10 to a raised position for transport purposes. When the folding implement 10 is in the transport position as shown in FIG. 4, the center line of the hinge pin 36 and the bushings 28, 30 and 32 is approximately vertical in both the longitudinal and transverse plane.

When the operator reaches the field in which the farm implement 10, shown as a corn planter in the preferred embodiment, is to be used, the hydraulic system of the tractor to which the implement assembly 10 is attached is actuated by the operator. The hydraulic piston and cylinder assemblies 38 and 42 are operatively connected to the tractor hydraulic system by means of suitable hydraulic hoses and valves which are not shown in the drawings. As shown in FIG. 1 of the drawings, when the outer folding wing sections 14 are in the folded or transport position as shown by the phantom lines, the hydraulic piston and cylinder assemblies 38 and 42 are in their extended positions, thereby causing the hinge pin 36 and attaching plate or flange 37 secured thereto to be rotated approximately ninety (90) degrees as seen in the top view of the right side of the farm implement 10 as shown in FIG. 1. When the tractor hydraulic system is actuated, the hydraulic actuating means in the form of the first and second hydraulic piston and cylinder assemblies 38 and 42 are caused to retract. The contraction, or reduction in length of the hydraulic actuating means or piston and cylinder assembly 42 causes the folding wing section 14 to pivot about the hinge pin 36 on the top and bottom bushings 30 and 32, respectively, approximately ninety (90) degrees. Simultaneously with the movement of the outer folding wing section 14 about the hinge pin 36, the retraction of the hydraulic actuating means in the form of piston and cylinder assembly 38 causes the hinge pin 36 to rotate in a counter-clockwise direction within the center bushing 28 rigidly secured to the main frame section 12. The simultaneous movement of the outer folding wing section 14 about the pivot pin 36 on bushings 30 and 32, and the rotation of the pivot pin 36 within the center bushing 28 causes the outer folding wing section 14 to rotate about the vertical axis of the pivot pin 36 approximately one hundred eighty (180) degrees into axial alignment with the main frame section 12, as shown in FIGS. 1 and 5 of the drawings.

Referring to FIG. 1, as the outer folding wing section 14 rotates in a clockwise direction into axial alignment with the main frame section 12, a drive coupling unit 52 operatively connected with a planter unit drive shaft 50 on the outer folding wing section 14 is engaged with the end of the planter drive shaft 50 on the main frame section 12. The planter unit drive shaft 50 is operatively driven by the implement 12 to supply power to the planter units 26 by means of belt drives, chain drives, or other suitable drive mechanism to operate the planter units to place the seed in the ground in a predetermined pattern in a manner well known and widely used in the farm implement art.

When the outer folding wing sections 14 are folded to the operating position shown by the solid lines in FIG. 1 and in FIG. 5, the vertically moveable drawbar 18 of the farm traction vehicle or tractor, not shown, is then ready for use. The vertically moveable wheel assemblies 24 are then moved to their vertical position to lower the farm implememt or planter assembly 10 to begin the planting operation.

When the operator completes the planting operation and desires to transport the implement 10 to another area, the vertically moveable wheel assemblies 24 are lowered to raise the farm implement 10 to the position shown in FIG. 5 of the drawings. The vertically moveable drawbar 18 operatively attached to the farm traction vehicle, not shown, is then raised to the position shown in FIG. 4 of the drawings to place the farm implement in the generally horizontal position. The operator of the farm traction vehicle then actuates the hydraulic system of the farm traction vehicle which is operatively connected with the hydraulic actuating means of the present invention, shown as hydraulic piston and cylinder assemblies 38 and 42 in the drawings. As shown in FIGS. 1 and 2 of the drawings, the hydraulic piston and cylinder assemblies 38 and 42 are extended to cause the outer folding wing section 14 to move in a counter-clockwise direction about the vertical axis of the hinge pin 36. The hinge pin 36 and the attaching plate or flange 37 is rotated approximately ninety (90) degrees in the center bushing 28 by the hydraulic actuating means or hydraulic piston and cylinder assembly 38, thereby causing the outer folding wing assembly 14 to be moved approximately ninety (90) degrees in a counter-clockwise direction. The second hydraulic actuating means or piston and cylinder assembly 42 then causes the outer folding wing assembly 14 to continue to move in a counter-clockwise direction approximately ninety (90) degrees by rotating the outer folding wing assembly 14 around the hinge pin 36 on bushings 30 and 32. This type of movement reduces the wear on the hinge pin 36 by causing the pin to move only approximately ninety (90) degrees in each direction, rather than pivoting a full one hundred eighty (180) degrees each time the outer folding wing section is moved between the folded and unfolded position.

A modification of the structure according to the present invention is illustrated in FIG. 6 of the drawings. The embodiment according to the present invention illustrated in FIGS. 1 through 5 of the drawings is used with an eight-row planter, which utilizes four planter units 26 mounted on the main frame section 12 and two planter units mounted on each of the outer folding wing sections 14. The outer folding wing sections 14 on the eight-row units are short enough in length such that when the wing sections 14 are folded forward to the transport position shown by the phantom lines in FIG. 1 of the drawings, the outer ends of the folding wing sections 14 do not interfere with the hitch tongue 16. However, the embodiment shown in FIG. 6 of the drawings is used with a twelve-row planter implement which has six planter units 26 mounted on the main frame section 12 and three planters units 26 mounted on each of the outer folding wing sections 14, thus requiring the outer folding wing sections 14 to be longer than the outer folding wing sections 14 of the eight-row planter implement. Accordingly, when the outer folding wing sections 14 of the twelve-row planter implements are folded forward to the transport position, the outer ends of the outer folding wing sections 14 must be raised to allow the outer folding wing sections 14 to fold above the hitch tongue 16 without interference therewith.

In order to allow the outer ends of the folding wing sections 14 of the modified embodiment shown in FIG. 6 to raise and clear the hitch tongue 16, the vertical axis of the hinge pin 36 is angled outwardly at the top at an acute angle when viewed from the rear of the farm implement. The placing of the vertical axis of the hinge pin 36 at an acute angle in the transverse plane of the farm implement causes the outer ends of the outer folding wing sections 14 to raise slightly when the outer folding wing sections 14 are folded forwardly to the transport position, thereby clearing the hitch tongue 16 and preventing interference therewith.

A further advantage of the positioning of the hinge pin 36 at an acute angle in the vertical transverse plane of the farm implement, thereby causing the outer end of the outer folding wing sections 14 to raise slightly when the folding wing sections 14 are folded forwardly to the transport position is to enable the outer ends thereof to be supported on top of the hitch tongue 16.

The twelve-row planter implement shown in the embodiment of FIG. 6 utilizes the same wing folding mechanism and hydraulic actuating means as illustrated in the other drawings and, in particular, FIGS. 1, 2 and 3. The construction and operation of the hydraulic folding means is also the same and, therefore, will not be described with specific reference to FIG. 6 of the drawings.

Having described the details of the preferred embodiments of the present invention, what is claimed is:

1. A hydraulically actuable horizontally folding tool bar for an agricultural implement comprising a transversely elongated main frame section adapted to be operatively attached to a traction vehicle; a plurality of support wheels operatively attached to said main frame section; a pair of foldable outer wing sections, one disposed at each end of said main frame section; a generally vertical hinge assembly mounted at each end of said main frame section operative between said main frame section and the corresponding one of said outer wing sections, each said hinge assembly including at least one bushing rigidly attached to a forward edge of an end of said main frame section, said bushing defining an opening therethrough, at least one other bushing rigidly attached to a forward edge of said corresponding outer folding wing section defining a central opening therethrough positioned in axial alignment with said first bushing, a hinge pin movably positioned within and extending through said openings in said first and second bushings to allow rotation of said outer wing section about the central axis of said hinge pin and a mounting flange associated with one end of said hinge pin; hydraulic actuating means for each of said wing sections, each of said hydraulic actuating means associated with said main frame section, said corresponding outer wing section and said hinge assembly, each of said hydraulic actuating means including a first hydraulic cylinder aligned with said main frame section and connected at one end to said main frame section and said first hydraulic cylinder connected at the other end to said mounting flange and a second hydraulic cylinder aligned with said outer wing section and connected at one end to said outer wing section and said second hydraulic cylinder connected at the other end to said mounting flange, said other end of said first and second hydraulic cylinders being coupled together by said mounting flange, such that said hydraulic cylinders interact through said mounting flange whereby, upon energization of said hydraulic actuating means, said corresponding outer wing section is folded with respect to said main frame section from a first or operating position wherein said outer wing section extends laterally from said main frame section to a second or transport position wherein said outer wing section is folded forwardly and in general transverse alignment with said main frame section and whereby said first and second hydraulic cylinders maintain their alignment with said main frame section and said outer wing section respectively.

2. A horizontally folding tool bar as in claim 1 wherein said mounting flange is rigidly attached to said hinge pin such that, upon actuation of said hydraulic actuating means, said bushings attached to said outer folding wing sections pivot about said hinge pin approximately 90° and said hinge pin rotates within said center bushing approximately 90° when said outer wing section moves from said first position to said second position, thereby reducing the amount of wear on said bushings and said hinge pin.

3. A horizontally folding tool bar as in claim 1 in which said hinge pin is disposed at a slight angle to the vertical such that when said outer wing section is folded to the transport position, its then innermost end will be at a height above the main frame section to provide adequate clearance.

* * * * *